Oct. 15, 1940.  J. E. CAMPEN  2,217,859
MEASURING INSTRUMENT
Filed April 6, 1938
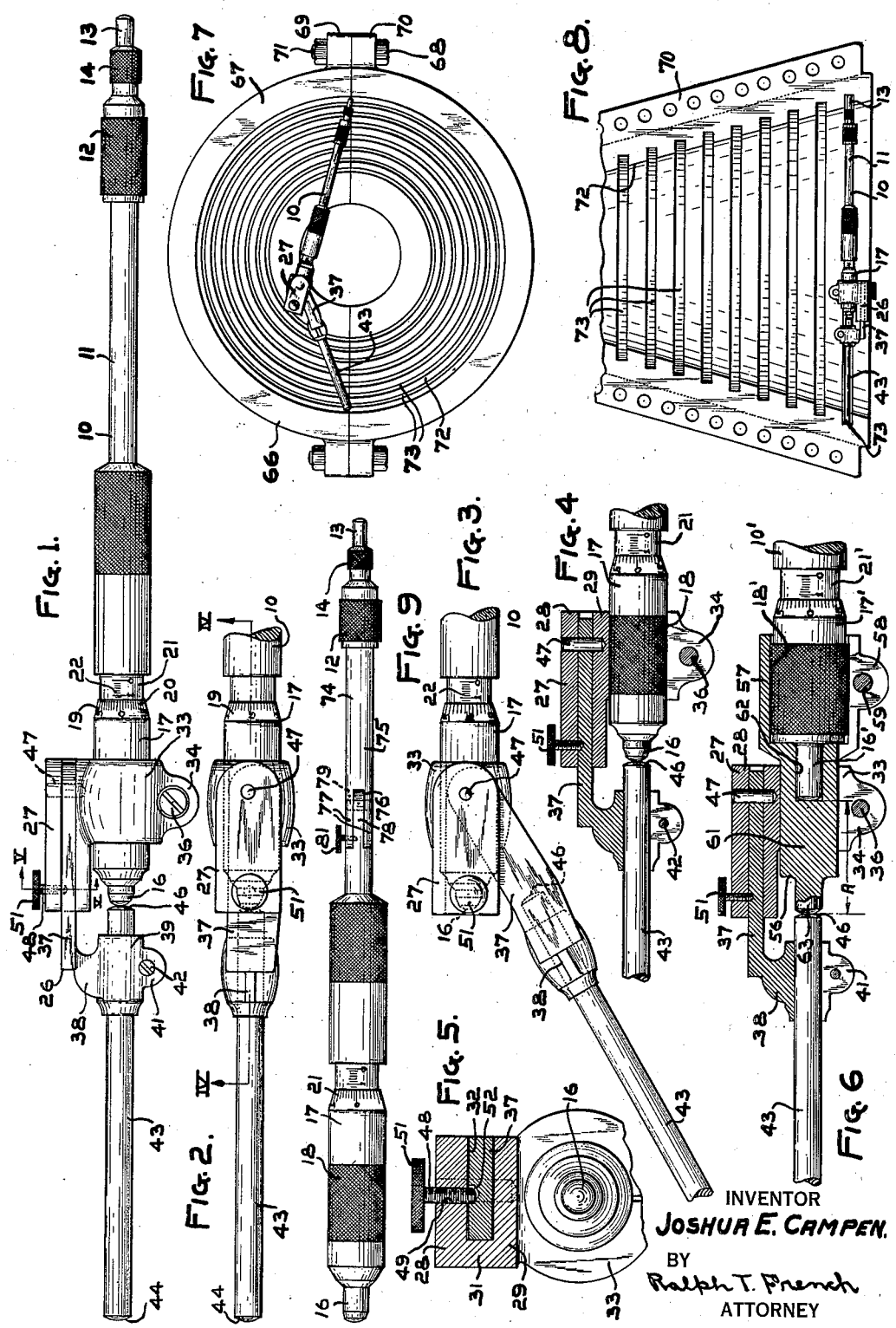
INVENTOR
JOSHUA E. CAMPEN.
BY
Ralph T. French
ATTORNEY Patented Oct. 15, 1940

2,217,859

UNITED STATES PATENT OFFICE 2,217,859

MEASURING INSTRUMENT

Joshua Earle Campen, Prospect Park, Pa.

Application April 6, 1938, Serial No. 200,395

8 Claims. (Cl. 33—167)

My invention relates to measuring devices and more particularly to inside micrometers or calipers, and has for an object the provision of a device of this type which is capable of measuring dimensions under conditions rendering the use of previously known devices unsatisfactory.

A further object of my invention is the provision of an inside micrometer whose overall length can be reduced to materially less than its minimum measuring limit.

Another object of my invention is the provision of a straight inside micrometer whose normal overall length can be reduced an amount greater than its measuring range in a single simple movement.

Another object is the provision of a rod-like inside micrometer having a pivot joint intermediate its ends.

Yet another object is the provision of an attachment for standard straight inside micrometers now on the market which will adapt them for use in otherwise inaccessible places.

A further object of my invention is the provision of a pivoted extension attachment for standard straight inside micrometers in which the extension can be swung into alignment with the micrometer after the device has been placed in the desired position.

Another object of my invention is the provision of a device capable of measuring the inside diameters of grooves in the wall of a cylindrical bore, which grooves are deeper than the measuring range of the device.

A further object of my invention is the provision of an extension attachment for standard straight inside micrometers, together with an adapter, whereby one size of attachment may fit micrometers of different sizes.

These and other objects are effected by my invention as will be apparent from the following description and claims taken in accordance with the accompanying drawing, forming a part of this application, in which:

Fig. 1 is a side elevational view of my extension attachment applied to a well known type of inside micrometer;

Fig. 2 is a plan view of the structure of Fig. 1, a portion of the micrometer being omitted;

Fig. 3 is a view similar to that of Fig. 2, with the extension disposed at a 30 degree angle to the longitudinal axis of the micrometer;

Fig. 4 is a longitudinal sectional view taken on the line IV—IV of Fig. 2, looking in the direction of the arrows;

Fig. 5 is a transverse sectional view taken on the line V—V of Fig. 1, looking in the direction of the arrows;

Fig. 6 is a view similar to that of Fig. 4 showing the attachment applied, by means of an adapter, to a larger micrometer than that of Fig. 4;

Fig. 7 is an elevational view showing an inside micrometer embodying my invention being inserted, while partially collapsed, into an internally, circumferentially grooved turbine cylinder;

Fig. 8 is a plan view of the lower half of the turbine cylinder of Fig. 7, showing the micrometer straightened preparatory to measuring the diameter of the groove in which it is received; and, Fig. 9 is an elevational view showing a modification of my invention.

In the drawing there is shown a straight inside micrometer 10 of a construction well known in the art. An extension attachment 26 is clamped to the micrometer near one end thereof and includes a pivotal joint, as at 47, which allows an outer portion 43 to be swung between a position in longitudinal alignment with the micrometer and a position at an angle thereto, whereby the overall length of the combined micrometer and attachment may be changed materially by a single simple pivotal movement.

Referring now to Fig. 1, there is shown a straight inside micrometer 10, constructed and operating in a manner well known to those skilled in the art, and comprised by a shank 11 provided at one end with a chuck 12 in which is held a removable anvil 13 having a knurled finger piece 14. At the opposite end of the micrometer there is a fixed anvil 16 and adjacent thereto is rotatably mounted a cylindrical sleeve 17 having a knurled surface 18 for contact by the fingers of the operator. The inner end of the sleeve 17 is beveled, as at 19, the beveled surface having a circumferential series of graduations 20 thereon. A hub portion 21, adjacent the inner end of the sleeve 17, has a longitudinal series of graduations 22 thereon cooperating with the graduations 20 to indicate dimensions measured by the micrometer.

The numeral 26 indicates, in its entirety, an extension attachment comprised by a body 27 having an upper plate 28 and a lower plate 29 connected in spaced parallel relation by a side wall 31, whereby a rectangular space 32 is provided between the plates 28 and 29.

The body 27 is removably attached to the micrometer sleeve 17 by a split ring 33 embracing the knurled portion 18 of the sleeve. The ring 33 is provided with parallel projecting ears 34 adjacent the split and may be tightened to securely grip the sleeve 17 by adjustment of a screw 36 whose shank extends freely through one of the ears 34 and is threadedly received in the other ear, in a well known manner.

A flat arm 37 is provided with a depending neck 38 carrying a split ring 39 provided with parallel ears 41 having an adjustment screw 42, all functioning in a manner similar to the split ring 33, ears 34 and screw 36 described above. Clamped within the split ring 39 is an extension standard 43 having anvil portions 44 and 46 at its outer and inner ends, respectively. The flat arm 37 is of such a thickness as to be closely yet movably received in the space 32 between the plates 28 and 29. A cylindrical pin 47 extends vertically through the upper plate 28, through the arm 37 and into the lower plate 29 to secure the arm 37 to the body 27 for pivotal movement of the former relative to the latter. Such movement of the arm is limited in one direction by the side wall 31, against which the edge of the arm may abut. When the arm is in abutting relation with the side wall 31 (Figs. 1 and 2) the extension standard 43 is longitudinally aligned with the micrometer, with the inner anvil 46 of the extension standard contacting the micrometer anvil 16.

Means is provided for holding the arm in contact with the side wall 31 during normal use of the device and is comprised by a set screw 48 threadedly received in a vertical hole 49 in the plate 28. Preferably, the set screw is provided with a knurled head 51. As shown in Fig. 5, the point of the set screw enters a depression 52 in the upper surface of the arm 37 to positively lock the arm in its operative position. Preferably, the depression 52 is offset away from the side wall 31, relative to the centerline of the set screw, so that tightening of the screw tends to force or wedge the arm against the side wall.

Preferably also, the pivot pin 47 is slightly off-center toward the side wall 31 relative to the longitudinal centerline of the assembled micrometer and attachment, to provide for quick reduction of the overall length of the micrometer and attachment, and for producing "snap action" engagement of anvils 46 and 16 upon pivoting of the arm and extension standard to operative position in longitudinal alignment with the micrometer.

The micrometer 10, without the attachment 26, can be used for measuring only within certain definite limits, determined by the design and dimensions of the device. For example, by substituting for the anvil 13, anvils of greater length, the micrometer 10 might serve for measurements varying from 10 to 20 inches. With the use of my attachment 26, extensions of greater length may also be substituted for the extension standard 43, with the result that the measuring limits of the combined structure might be from 10 to 30 inches. In order to measure dimensions above this range a larger micrometer would have to be used.

In Fig. 6 I have shown means whereby the same extension attachment 26, shown in the preceding figures as fitting the micrometer 10, may be used with a larger micrometer 10'. In this figure the same attachment 26 is secured to a relatively large micrometer 10' by use of an adapter 56 having a split sleeve 57 clamped about the knurled portion 18' of the micrometer sleeve 17' by a pair of parallel projecting ears 58 drawn toward each other by a screw 59 in a well known manner. The split sleeve 57 has extending therefrom, in alignment with the longitudinal axis of the micrometer, a cylindrical shank 61 of such a diameter that it may be closely received within the split ring 33 of the attachment 26. The shank 61 is internally recessed for a portion of its length, as at 62, for reception of the anvil 16' of the micrometer. An anvil 63 extends from that end of the shank 61 opposed to the split ring 57 and bore 62. The dimension "A," from the inner end of the recess or bore 62 to the tip of the anvil 63, preferably is exactly one inch or a multiple thereof in order that with a zero reading of the micrometer calibrations the overall length of the combined micrometer, adapter, and extension attachment will be an exact multiple of an inch.

In Figs. 7 and 8 I have illustrated one situation in which my invention may be used to great advantage. A turbine cylinder 66 is formed by an upper casing 67 and a lower casing 68 provided with meeting flanges 69 and 70, respectively. The casings 67 and 68 are joined by means such as bolts 71 extending through the flanges 69 and 70. The cylinder 66 is provided with a longitudinally tapered bore 72 and a plurality of circumferential grooves 73, for the reception of the root portions of stationary blades or vanes (not shown). These grooves must be machined to prescribed depths or diameters which must be checked by micrometer readings. As these grooves usually have a depth of considerably more than one inch, it is impossible to get a standard straight micrometer into opposed grooves, the limit of adjustment of such a micrometer being only one inch.

Fig. 7 shows a combined micrometer and attachment in position to be inserted into a groove. The arm 37 of the attachment has been swung out of longitudinal alignment with the micrometer to greatly reduce the overall length of the device.

Fig. 8 shows the arm 37 and extension standard 43 swung to operative position in longitudinal alignment with the micrometer, for determination of the diameter of the groove 73 by relative rotation of the sleeve 17 and shank 11. After taking of the reading, the device may be shortened, for removal from the groove, by a single swinging movement of the arm 37.

In Fig. 9 I have shown another adaptation of my invention. In this construction a standard straight inside micrometer 74, similar to the micrometer 10 of Fig. 1, is provided with a pivoted joint 76 intermediate the ends of the shank portion 75. The joint is comprised by a bifurcated portion 77 and a flat portion 78 swingably mounted in the space between the legs of the bifurcated portion. A pivot pin 79 extends through the bifurcated portion 77 and the flat portion 78 to pivotally join them. A set screw 81 is threadedly mounted in one of the legs of the bifurcated portion, and its point is adapted to enter a recess (not shown) in the adjacent surface of the flat portion 78 to lock the portions in longitudinally aligned position.

It is thought that the operation of this modification of the invention will be obvious to those skilled in the art, particularly in view of the description given above in connection with the structure shown in the other figures.

While I have shown my invention in several forms, it will be obvious to those skilled in the art that it is not so limited but is susceptible of various other changes and modifications without departing from the spirit thereof, and I desire, therefore, that only such limitations shall be placed thereupon as are imposed by the prior art or as are specifically set forth in the appended claims.

What I claim is:

1. An attachment for inside calipers comprising a body portion, means for securing said portion to an inside caliper adjacent an end thereof, a holding member carried by the body portion, and an extension member held thereby normally longitudinally aligned with the caliper, said holding member being movable relative to the body portion whereby the extension member may be disposed at an angle to the longitudinal axis of the caliper.

2. An attachment for inside calipers comprising a body portion, means for securing said portion to a straight inside caliper adjacent an end thereof, an arm carried by said portion and provided with holding means, and an extension standard held thereby normally longitudinally aligned with the caliper, said arm being movable relative to the body portion whereby the extension standard may be disposed at a material angle to the longitudinal axis of the caliper to reduce the overall length of the combined caliper and attachment.

3. An attachment for inside calipers comprising a bifurcated body portion, a first split ring clamp carried by the body portion for attaching the latter to an inside caliper, an arm having one end mounted in the bifurcation of the body member for pivotal movement about an axis at right angles to the longitudinal axis of the split ring clamp, a second split ring clamp carried by the other end of the arm normally in longitudinal alignment with the first split ring clamp, and an extension standard held by the second split ring clamp.

4. An attachment for inside calipers comprising a bifurcated body portion, a first split ring clamp carried by the body portion for attaching the latter to an inside caliper, an arm having one end mounted in the bifurcation of the body member for pivotal movement about an axis at right angles to the longitudinal axis of the split ring clamp, a second split ring clamp carried by the other end of the arm normally in longitudinal alignment with the first split ring clamp, and an extension standard held by the second split ring clamp, the arm being swingable from a measuring position with the extension standard aligned longitudinally with the centerline of the first split ring clamp through an arc greater than 30 degrees.

5. An attachment for inside calipers comprising a bifurcated body portion, a first split ring clamp carried by the body portion for attaching the latter to an inside caliper, an arm having one end mounted in the bifurcation of the body member for pivotal movement about an axis at right angles to the longitudinal axis of the split ring clamp, a second split ring clamp carried by the other end of the arm normally in longitudinal alignment with the first split ring clamp, an extension standard held by the second split ring clamp, the arm being swingable from a measuring position with the extension standard aligned longitudinally with the centerline of the first split ring clamp through an arc greater than 30 degrees, and means for locking the arm in measuring position.

6. An attachment for inside calipers comprising a bifurcated body portion, a first split ring clamp carried by the body portion for attaching the latter to an inside caliper, an arm having one end mounted in the bifurcation of the body member for pivotal movement about an axis at right angles to the longitudinal axis of the split ring clamp, a second split ring clamp carried by the other end of the arm normally in longitudinal alignment with the first split ring clamp, an extension standard held by the second split ring clamp, the arm being swingable from a measuring position with the extension standard aligned longitudinally with the centerline of the first split ring clamp through an arc greater than 30 degrees, and means for locking the arm in measuring position, said means comprising a set screw threadedly mounted in a branch of the bifurcated body portion and adapted to enter a depression in the arm.

7. An attachment for inside calipers comprising a body member, means carried by said body member for attaching the latter to an inside caliper, an arm mounted on the body member for pivotal movement relative thereto, an elongated straight extension standard carried by the arm, a stop on the body member and against which one side of the arm abuts in one position of the latter to limit pivotal movement thereof, means for locking said arm in abutting position, and a pivot pin mounting the arm on the body member, the longitudinal axis of said pin being perpendicular to the longitudinal axis of the extension standard and offset therefrom to the side adjacent the stop.

8. For use with a straight inside caliper comprised by a shank, a sleeve surrounding one end thereof and rotatable and movable longitudinally relative thereto, and an anvil projecting longitudinally from the end of said sleeve; an extension attachment comprising a body portion, means carried by the body portion for attaching the latter to the caliper sleeve, an arm connected to said body portion for pivotal movement relative thereto about an axis at right angles to the longitudinal axis of the caliper, and an extension standard held by said arm longitudinally aligned with the caliper with one end contacting the caliper anvil, the arm and extension standard being pivotable to a position in angular relation to the longitudinal axis of the caliper to reduce the overall length of the combined caliper and attachment, whereby said caliper and attachment may be inserted into otherwise inaccessible opposed grooves, recesses, or the like.

JOSHUA EARLE CAMPEN.